(12) United States Patent
Lee et al.

(10) Patent No.: US 9,773,053 B2
(45) Date of Patent: Sep. 26, 2017

(54) METHOD AND APPARATUS FOR PROCESSING ELECTRONIC DATA

(75) Inventors: Beum Seuk Lee, London (GB); Zhan Cui, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 156 days.

(21) Appl. No.: 13/996,840

(22) PCT Filed: Dec. 23, 2011

(86) PCT No.: PCT/GB2011/001771
§ 371 (c)(1),
(2), (4) Date: Jun. 21, 2013

(87) PCT Pub. No.: WO2012/085518
PCT Pub. Date: Jun. 28, 2012

(65) Prior Publication Data
US 2013/0290338 A1    Oct. 31, 2013

(30) Foreign Application Priority Data
Dec. 23, 2010 (EP) .................................. 10252202

(51) Int. Cl.
*G06F 7/00* (2006.01)
*G06F 17/30* (2006.01)

(52) U.S. Cl.
CPC .. *G06F 17/30598* (2013.01); *G06F 17/30294* (2013.01); *G06F 17/30566* (2013.01);
(Continued)

(58) Field of Classification Search
CPC ......... G06F 17/30569; G06F 17/30294; G06F 17/30914
See application file for complete search history.

(56) References Cited

U.S. PATENT DOCUMENTS

2003/0014617 A1* 1/2003 Tamboli et al. ................... 713/1
2003/0120651 A1* 6/2003 Bernstein et al. ................. 707/6
(Continued)

OTHER PUBLICATIONS

Jung, Jason J. "Semantic Business Process Integration Based on Ontology Alignment." Expert Systems with Applications 36 (2009). 8 pages.*
(Continued)

*Primary Examiner* — Charles Lu
(74) *Attorney, Agent, or Firm* — Nixon & Vanderhye P.C.

(57) ABSTRACT

A system (100) for generating a computer readable data file representative of a mapping between a first representation of a set of concepts or of a data structure (e.g. a database schema) and a second representation of a set of concepts or of a data structure (e.g. an ontology), each representation comprising a plurality of complex representational elements (e.g. tables in a database schema and concepts in an ontology) each of which may itself include a number of associated subordinate representational elements (e.g. columns/fields of a table in a database schema and attributes of a concept in an ontology). The system (100) includes a semantic similarity calculation module (134) for calculating a semantic similarity measure between a subordinate element of the first representation and each of the subordinate elements in the second representation and a mapping generation module (137) for generating a mapping between the subordinate element of the first representation and one of the subordinate elements of the second representation selected in dependence upon the calculated semantic similarity measures between the subordinate elements.

6 Claims, 8 Drawing Sheets

(52) U.S. Cl.
CPC .. *G06F 17/30569* (2013.01); *G06F 17/30731* (2013.01); *G06F 17/30914* (2013.01)

(56) References Cited

U.S. PATENT DOCUMENTS

| | | | |
|---|---|---|---|
| 2003/0172368 A1* | 9/2003 | Alumbaugh et al. | 717/106 |
| 2006/0253860 A1* | 11/2006 | Hoerle et al. | 719/328 |
| 2008/0046441 A1* | 2/2008 | Wen | G06F 17/2241 |

OTHER PUBLICATIONS

International Search Report for PCT/GB2011/001771, mailed Feb. 22, 2012.

* cited by examiner

C side
- name (string)
- type (string)
- status (string)

C line
- directory_number (string)
- type (string)
- length (string)

C exchange
- location (string)
- name (string)
- number_of_cables (string)

network.DIST_SIDE
- CABLE_NUM (VARCHAR2)
- D_NAME (VARCHAR2)
- TYPE (VARCHAR2)

network.MASTER_LINE_INF
- DIRECTORY_NO (VARCHAR2)
- LENGTH (VARCHAR2)
- LINE_NO (VARCHAR2)
- LN_TYPE (VARCHAR2)
- MAC_ADDR (VARCHAR2)

network.T1_EXCHANGE
- ADDRESS (VARCHAR2)
- EX_NAME (VARCHAR2)
- FAULT_HIST (VARCHAR2)
- INSTALL_PLACE (VARCHAR2)

Figure 3

METHOD AND APPARATUS FOR PROCESSING ELECTRONIC DATA

FIELD OF THE INVENTION

The present invention relates to a method and apparatus for processing electronic data, and in particular, to a method and apparatus for integrating data from heterogeneous data sources to enable users and devices to work seamlessly with such heterogeneous data sources and particularly to a method and apparatus for automatically generating and/or assisting a user to generate mappings between different descriptions of stored electronic data, or ontologies or data schema.

BACKGROUND TO THE INVENTION

There is acknowledged to be a general problem of data overload and information poverty. This arises because electronic data from different sources are stored on different computing systems, in different formats and described using different vocabularies. This makes it very difficult for computers in particular to process electronic data from these different sources in a way which enables the data from one source to be integrated with the data from another source. Differences in the vocabulary used within formal descriptions of data (e.g. ontologies and database schema) are often referred to as semantic heterogeneity and this causes particular difficulty when attempting to generate mappings between different formal descriptions of data.

Many solutions have been proposed for automatically generating mappings between descriptions of data such as ontologies and database schema. However, in general, all such methods ultimately require a large amount of human time and effort. Given the enormous amount of electronic data stored in semantically heterogeneous sources, progress in enabling data from these sources to be integrated is very slow.

One particularly promising method of integrating data from semantically heterogeneous sources is to use "ontologies". A popular definition of an ontology is that it is an explicit formal specification of a conceptualisation. Formal here means some logical formalism. A conceptualisation includes: concepts, which may denote real or abstract entities such as Person, Animal, Dog, Mood and Condition; each concept may have attributes (for example a concept Person may have attributes such as name, sex, date-of-birth and eye-colour); and relationships, such as "Person is a sub category of Animal", "Person has Dog as pets", and "Person has Mood". Attributes and relationships add information to concepts, and can be thought of as giving a sort of formal meaning to these concepts. Furthermore, an ontology normally includes axioms which further constrain the interpretation of concepts. Example axioms are: "Person and Dog are disjoint"; "Mood cannot apply to Condition", and so on. The specification of an ontology for a domain depends on the point of view of the author of the ontology. A domain could be modeled differently for different purposes. As models always simplify the reality, there are often different ontologies even for the same domains.

Ontologies can assist in integrating data from semantically heterogeneous databases by providing precise, machine "understandable" definitions of what differently used terminologies, in the different data sources to be integrated, actually mean. For example, a first database might refer to "model ID" and a second database might refer to the same category as "product No.". Each of these could be mapped to a corresponding concept in a common ontology (e.g. "Product.Identification_Code") and then a user or software application which refers to the concept "Product" can successfully obtain actual data from both of the integrated data sources by using the respective mappings between the common ontology and the descriptions (e.g. database schema) of the first and second databases.

Difficulties that need to be overcome by an automated mapping process include the fact that the same or very similar terms may be used in different data descriptions to mean very different things and very different terms may be used in different data descriptions to mean the same thing (this is a consequence of natural languages such as English behaving in the same way—i.e. the same or similar words in English may have more than one, possibly very different, meaning and very different words may have the same or very similar meanings). When human beings converse they can usually easily discern the correct intended meaning for a given word based on the context in which the word is used but that context is often not available in a machine understandable format to a computer when it is attempting to perform a mapping operation between an ontology and a formal data description such as a database schema. Additionally, data descriptions (especially database schema) often use abbreviated terms rather than actual real words (e.g. "CName" instead of "Customer Name", etc.).

SUMMARY OF THE INVENTION

According to a first aspect of the present invention, there is provided a method of generating a computer readable data file representative of a mapping between a first and a second representation of a set of concepts (e.g. an ontology) and/or of a data structure (e.g. a database schema) each representation comprising a plurality of complex representational elements (e.g. concepts of an ontology or tables in a database schema) each of which may itself include a number of associated subordinate representational elements (e.g. attributes of concepts in an ontology or columns of a table in a database schema), the method comprising:

calculating a semantic distance measure between a subordinate element of the second representation (e.g. a column of a database schema) and each of the subordinate elements in the second representation (e.g. the attributes of an ontology or portion thereof); and generating a mapping between the subordinate element of the second representation and one of the subordinate elements of the first representation selected in dependence upon the calculated semantic distance measures between the subordinate elements; wherein calculation of a semantic distance measure includes:

using a linked top ontology data structure comprising a plurality of concept nodes arranged to form a top ontology, the top ontology being a partial subset of a full ontology having at least twice as many nodes as the top ontology, the nodes in the top ontology being selected from the full ontology based on their ancestral closeness to a root node and/or their ancestral remoteness from a leaf node of the full ontology, the linked top ontology further comprising a plurality of pre-processed vocabulary terms each of which is linked to one or more of the nodes in the top ontology, the linked top ontology data structure being used as follows:

the names of the subordinate elements between whom a semantic distance is to be calculated being compared with the vocabulary terms and for any vocabulary terms which match the names of the subordinate elements, identifying the top ontology nodes associated with the matched vocabulary terms and comparing the identified top ontology nodes associated with each name of the subordinate elements, and determining a semantic distance based on the degree of commonality between the top ontology nodes associated with each of the subordinate elements.

The method may further comprise performing similar steps of matching names to vocabulary terms, identifying the top ontology nodes associated with any matched vocabulary terms and determining a degree of commonality between the so identified top ontology nodes in respect of the names of the complex representational elements associated with or which include the respective subordinate elements between which the semantic distance is to be calculated and using the degree of commonality determined between these complex elements as a factor in the determination of overall semantic distance.

The method may further comprise performing similar steps of matching names to vocabulary terms, identifying the top ontology nodes associated with any matched vocabulary terms and determining a degree of commonality between the so identified top ontology nodes in respect of the names of the complex representational elements associated with or which include the respective subordinate elements between which the semantic distance is to be calculated and the irrespective (or converse) subordinate elements (e.g. comparing an ontology concept with a column name and comparing an ontology attribute with a database table, etc.) using the degree of commonality determined between these complex elements and their irrespective (or converse) subordinate elements as a factor in the determination of overall semantic distance.

The top ontology may be formed in a number of ways. Although the top ontology is properly considered to be a sub-set of a full ontology, the full ontology of which it is a subset might not actually exist. For example, if the top ontology is derived from a dictionary or lexicon or even an ordered collection of words which nonetheless is not sufficiently well structured to be considered an ontology itself (e.g. the well known WordNet collection which describes itself as a lexical database) then the full ontology from which the top ontology is derived may not actually have been formed. Nonetheless, the top ontology can be considered a partial subset of the notional full ontology that could have been formed if the entirety of the collection were used. This is in fact the process which has been adopted in the specific embodiment described below.

One can consider the top ontology as being a subset of the full ontology derived by drawing a dividing line through the full ontology and removing all entries lying below the dividing line. Clearly there are a number of ways in which such a dividing line could be generated—for example, it could be formed by counting down a number of levels from a root node (or nodes if there are multiple root nodes rather than a single universal root node), or conversely by counting up a certain number of levels from the leaf nodes, or (since different branches may have very different lengths in terms of the number of levels present), for each branch the line could be chosen to come some fraction, in terms of number of levels, (e.g. halfway) between leaf node and root node, or some combination of these approaches could be used (e.g. discard all leaf nodes and all nodes more than 6 levels removed from the (or a) root node).

In general, a Linked Top Ontology suitable for use in the present invention has three main components: a top ontology, dictionary vocabularies, and a set of links between the ontology concepts and the vocabularies. A top ontology preferably contains less than 10% of the words in a typical dictionary (e.g. WordNet contains 150,000 words). The top ontology employed in the specific embodiment described below contains about 5,600 words. Within the top ontology, these ontology concepts are arranged as a topology according to the word senses. There are links between the top ontology concepts and the full dictionary words. One dictionary word can be linked to more than one top ontology concept. For example, the dictionary word (i.e. the vocabulary term) 'bank' would have links to ontology terms in the top ontology such as financial_organization or geological_formation.

The step of identifying a semantic distance measure between two terms to be compared in order to ascertain whether or not they (or rather the representational elements which they name) should be mapped to one another is preferably supplemented with other techniques such as determining a syntactic similarity between the terms (e.g. using an edit distance, and/or a measure of how similar two words might sound if spoken aloud) and both the semantic and syntactic distance measurements may be made after some preprocessing such as word stemming or dividing terms which are compound terms into the individual component terms (e.g. converting CustomerName to Customer Name) from which they are formed, or expanding common abbreviations, etc.). If a syntactic similarity measure is calculated it can be used as a component in an overall similarity score or it could be used to check that a mapping based on semantic distance is only made if the syntactic similarity measure satisfies a threshold similarity measure. As an additional component in a multiple component similarity evaluation, the types of instance data associated with the respective representational elements being compared could be used as a factor (e.g. if the instance value type (e.g. String) is the same then this could add a component to the evaluation—in general such a component should not be too high as in databases often type String is used for all data types regardless of the actual data being stored—e.g. numbers are often stored as strings whereas in an ontology something which is always a number would normally have a more appropriate data type e.g. as a number). More sophisticated embodiments could use more sophisticated evaluations based on data type—e.g. where functions exist to convert data from one type to another (e.g. String to Number converters) then such data types could contribute positively towards a composite evaluation of overall similarity etc.

The matching of representational element names to vocabulary terms may be performed on the basis of an exactmatch, or it may be performed on the basis of a match made after preprocessing. A particularly beneficial preprocessing is word stemming. In this approach a word is stemmed to its linguistic root stem (e.g. swimming is stemmed to swim, etc so as to arrive at the term as it commonly appears within a dictionary). The vocabulary terms are also specified as root stems and so can be easily compared to identify a match.

The degree of commonality between two sets of top ontology node names is preferably based on the number of common nodes in the two sets but reduced in some amount by the number of nodes in one (or both) of the sets. When the degree of commonality is being determined between a single reference set of terms and several other target sets of terms, the number of terms in the reference set is irrelevant since it will be the same in each comparison and hence can be factored out, but the degree of commonality with the different target sets should depend inversely on the number of names in each target set of names since the more of these there are the more likely it is that some of the names will match.

For example, if a semantic distances were to be calculated between a column/field (a subordinate representational element) having the name "number" and two different attributes (also subordinate representational elements) having names "type" and "identifier", then the word "number" would be matched to the vocabulary term "number" and then the top ontology nodes to which this vocabulary term is linked would be identified and would form a first reference set of top ontology nodes (which might, for example be Magnitude, Attribute, Property) and these would then be compared first with a first target set of top ontology nodes linked to the vocabulary term "type" (e.g. perhaps Category, Concept, Attribute, Idea, Thought) giving a closeness of ¼—one match divided by four terms in the first target set—and then compared with a second target set of top ontology nodes linked to the vocabulary term "identifier" (e.g. perhaps Attribute, Symbol) giving a closeness of ½, etc.

The similarity evaluation methodology could be implemented into complete systems in a number of different ways. For example it could be used to form a completely automated mapping generator in which a database schema (for example) and a target ontology (for example) are provided to the system and the system loops through all of the column/field names of all of the tables in the database schema and generates mappings to attributes in the ontology to generate a complete mapping form the database to the ontology without intervention form a human user. Alternatively the method could be implemented in a semi-automatic mapping tool in which the user selects a single table (or even just a single field within a table) and then checks the mappings generated automatically by the tool and corrects any mistakes made by the system before proceeding to the next table or column/field until eventually the user has proceeded through the entire database schema and a complete mapping is thus generated. Note that it is expected that for some time there will still need to be a level of human overseeing and intervention in order to generate correct mappings using a tool such as one in accordance with the present invention.

The mappings, once they have been created, can be used within an integrated database system via which different devices can communicate with each other (and with back end storage devices) all using a single common language (a common ontology to which mappings from a local ontology or database schema or other form of data structure representation have been made using a method according to the present invention). Thus, for example, a system might include two databases, one storing configuration details for routers and another storing router location details within a network architecture database. An application might want to access all routers located in a particular region or being connected to a certain class of other network devices (and so would need to access the data from the second database in order to identify such routers) and then to change their configuration details to a particular configuration (the details of which might be stored in the first database). By using the system in which all underlying databases are mapped to a common ontology, it is possible to automate this process in a very straightforward manner. An integrated database system can provide a unified view of the underlying data available in all of the underlying databases and this will appear to external applications as though it were a single unified database, and complex queries requiring access to separate underlying databases can be submitted to the system as simple queries (e.g. for all Routers where Location equals X Set Configuration to Configuration Y). Alternatively, a first application might want to send such configuration files and the identities of routers whose configurations should be so changed to another application for some reason (e.g. because it should be responsible for executing the reconfigurations).

Further aspects of the present invention relate to corresponding methods and apparatuses to the above identified apparatus and method aspects of the present invention, and to a computer readable media, especially tangible and/or non-transitory media such as a magnetic or optical storage disk (e.g. a hard drive or a CD or DVD), or a solid state memory device (e.g. non-volatile RAM, an SSD hard drive, or a USB thumb-drive), or any other non-transitory computer readable storage medium storing a computer program or programs for causing a computer to carry out a method in accordance with the present invention.

Preferred features of the present invention are set out in the appended dependent claims.

BRIEF DESCRIPTION OF THE FIGURES

In order that the present invention may be better understood, embodiments thereof will now be described, by way of example only, with reference to the accompanying drawings in which:

FIG. 3 is a schematic block diagram of a portion of a database schema and a portion of an ontology before mapping;

DETAILED DESCRIPTION OF A FIRST EMBODIMENT

A first embodiment of the present invention, which comprises a system for integrating heterogeneous data sources including a computer arranged as a semi-automatic mapping generator system to assist a user in generating mappings for use in the data integration system. The semi-automatic mapping generator system enables a user to easily generate mappings between two representations of a data structure. Thus, for example, the system can assist a user to generate mappings between two ontologies, two database schema or (most usefully) between a database schema and an ontology.

Description of Hardware

Figure 1:
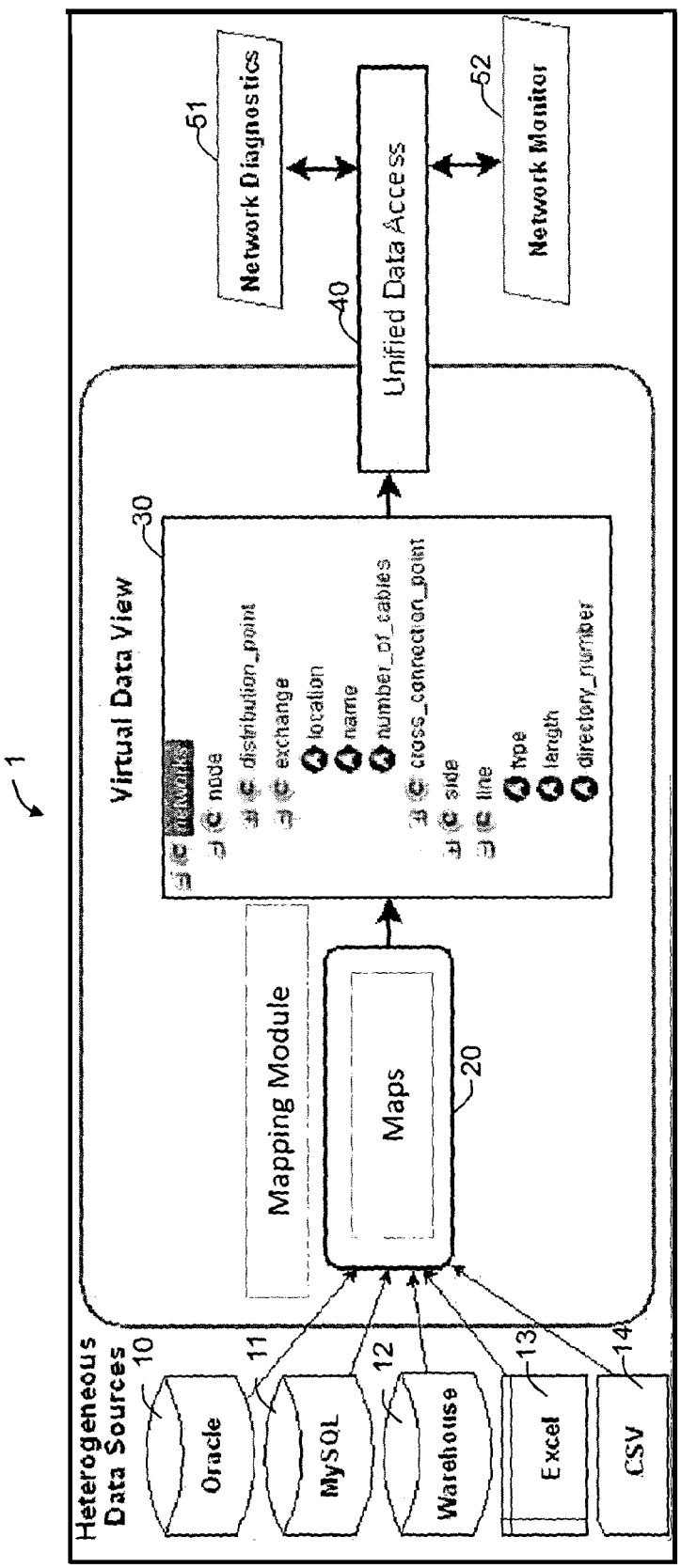
FIG. 1 is an illustration of an integrated database system including a plurality of heterogeneous data stores, a unit for mapping from the data stores to a central system which presents a unified view over all of the data sources to external applications and/or users.

FIG. 1 shows a data integration system 1 for providing an integrated "view" over a plurality of heterogeneous data sources. As shown, the system includes a plurality of heterogeneous data sources 10-14 including, in this embodiment, an Oracle Database 10, a MySQL database 11, a data warehouse 12 an Excel Spreadsheet based data base 13 and a comma separated values structured database 14. Each of these is "mapped" to a common ontology via a Mapping Module 20. The mapping module 20 stores a number of mappings between a common ontology which is used for presenting the unified view to external users and/or applications such as the applications 51 and 52 discussed below, and to a representation of the data structure of the heterogeneous data sources 10-14 (for example a database schema). Using these stored mappings, the mapping module is able to convert requests received from an external program (e.g. 51, 52) into appropriate queries for the underlying heterogeneous data sources, to receive a reply from the respective data source(s) and to assemble separate responses into a single response and to convert it into a format consistent with the common ontology so as to provide an integrated response to the external application/user in the expected format (corresponding to the common ontology). The virtual data view 30 is a component of the system which provides the interface to external users as well as to external applications when used in combination with the unified data access module 40. The virtual data view basically provides an expandable/collapsible tree view of the ontology as specific to the underlying databases 10-14. The data can either be presented as an image on a display for a human user to view or it can be provided as data via the unified data access module to external programs. The unified data access 40 is basically an Application Programmable Interface (API) by which external programs may submit queries and requests to the system and receive responses therefrom. etc.

FIG. 1 illustrates two external applications that may use the data integration system 1, a Network Diagnostics system 51 which queries over the data through Unified Data Access API 40, runs a diagnostic analysis over the data, and returns a prediction result to the second illustrated external application which is a Network Monitor system 52 which is operable to warn if there is an impending network failure. The Network Monitor system 52 detects the declination of the network performance and requests the Network Diagnostics system 51 to verify any such problem and to identify the location of the failed area. These communications are carried out through Unified Data Access 41 using common terms associated with the common ontology employed by the data integration system 1.

Figure 2:
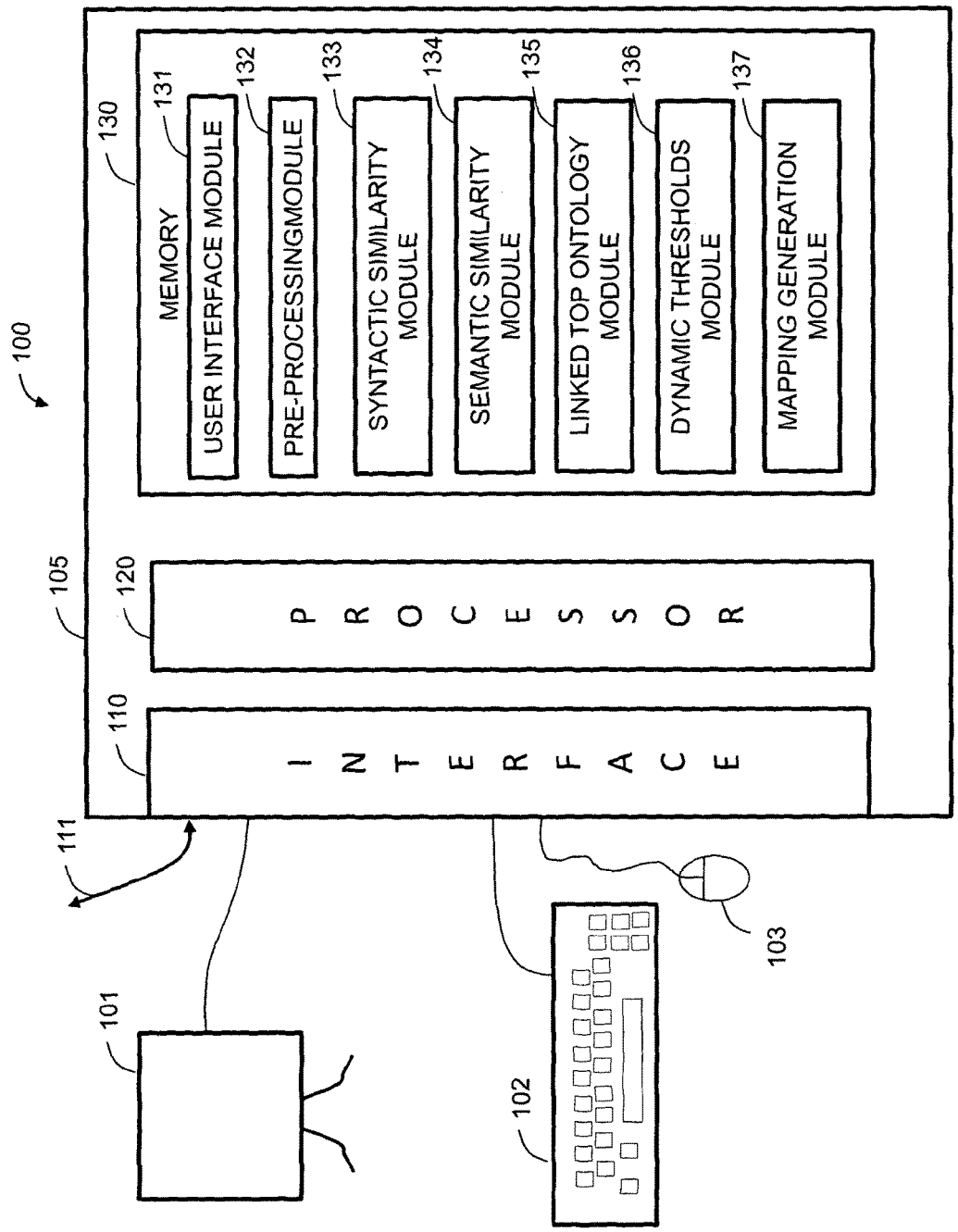
FIG. 2 is a block diagram of a computer configured to provide a mapping tool for assisting users to generate mappings suitable for use in the system of FIG. 1.

FIG. 2 illustrates a system block diagram of a system 100 for generating the mappings which are used by the mapping module 20 of the data integration system 1. The system 100 is basically a computer system specially programmed to perform semi-automatic mapping generation functions described below in greater detail. The system 100 includes various user interface devices including a display 101, a keyboard 102 and a mouse pointer device 103. The system 100 also includes a network connection 111 by which data may be passed between the system 100 and the data integration system 1—especially in order to enable mappings generated by the system 100 to be sent to the system 1 for use in the mapping module 20 thereof. Where the computer system 100 is used in a network environment, as in the present embodiment, it should further be understood that the application programs, other programs, and other data which may be stored locally in the computer system may also be stored, either alternatively or additionally, on remote computers, and accessed by the computer system 100 by logical connections formed over the network to which the system is connected via its network connection 111.

Housed within a computer chassis 105 are an interface 110 (to which the user interface devices 101-103 and the network connection 111 are connected), a processor unit 120 and a memory 130. The memory 130 includes a number of code modules 131-137 which cause the processor to operate so as to perform the various functions with which each code module is associated, when the code is installed and operating in the system 100. The functions associated with each code module are described in greater detail below. The seven illustrated code modules 131-137 are:

a user interface module 131 which is associated with a user interface function responsible for controlling the display presented to a user on the display 101 and for responding appropriately to input user commands made by a user via the keyboard 102 and mouse 103;

a pre-processing code module 132 which is associated with a pre-processing function for pre-processing names of representational elements prior to performing syntactic and semantic similarity analyses of such names;

a syntactic similarity code module 133 which is associated with a syntactic similarity function for determining a syntactic similarity between names of representational elements;

a semantic similarity code module which is associated with a semantic similarity function for determining a semantic similarity between names of representational elements;

a linked top ontology module which contains instructional code elements and data required to perform a linked top ontology function which retrieves top ontology terms which are linked to vocabulary terms (according to pre-defined links) in response to a request which specifies a vocabulary term;

a dynamic thresholds code module which is associated with a dynamic thresholds function for generating a threshold of similarity which can be used to decide whether or not two representational elements should be mapped to each other or not; and a mapping generation code module associated with a function for generating mappings (including mappings between individual representational elements and entire mappings between entire representations).

Data Structure Representations

Referring now to FIG. 3, the semi-automatic mapping system 100 of the present embodiment is operable to generate (or assist a user in generating) a mapping between two representations of a data structure. FIG. 3 illustrates (a graphical representation of) a portion of a first representation of a data structure, namely a portion of (a graphical representation of) a database schema, comprising three database tables presented on the left hand side of FIG. 3 and named DIST_SIDE, MASTER_LINE_INF and T1_EXCHANGE. On the right hand side of FIG. 3 there is shown (a graphical representation of) a portion of an ontology (an ontology is itself of course considered to be a representation of a data structure within the present application)—the illustrated portion comprises three concepts: side, line and exchange.

Each of these concepts includes three attributes (e.g. the concept side has attributes name, type and status).

Figure 4:
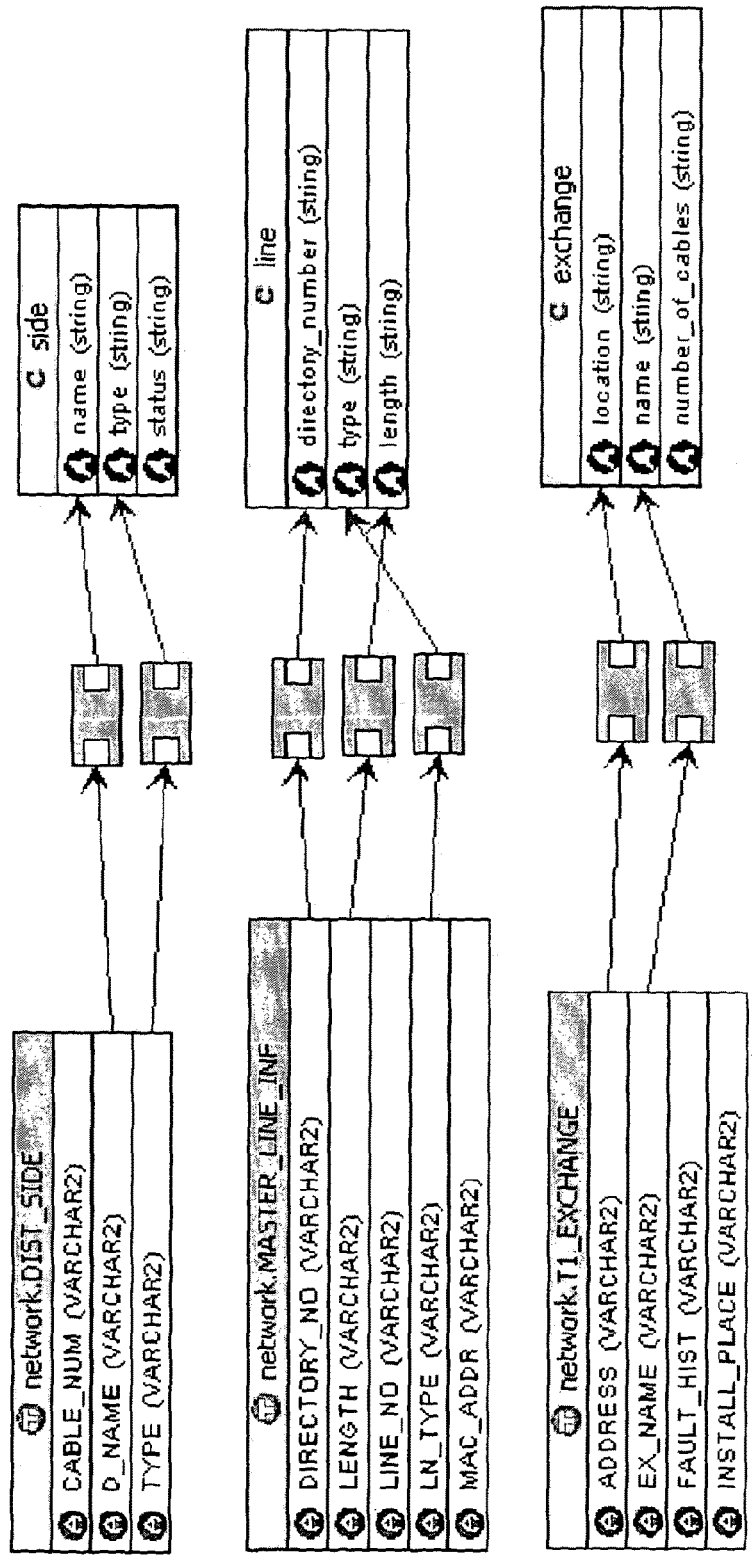
FIG. 4 shows the data base schema and ontology portions of FIG. 3 after mapping has been performed.

Once the human operator has performed a mapping between the database schema and the common ontology the portions shown in FIG. 3 are mapped to one another in the manner illustrated in FIG. 4. Thus the columns ADDRESS and EX_NAME of the table T1_EXCHANGE are mapped to the attributes location and name of the ontology concept exchange, respectively.

The Mapping Process

Figure 5:
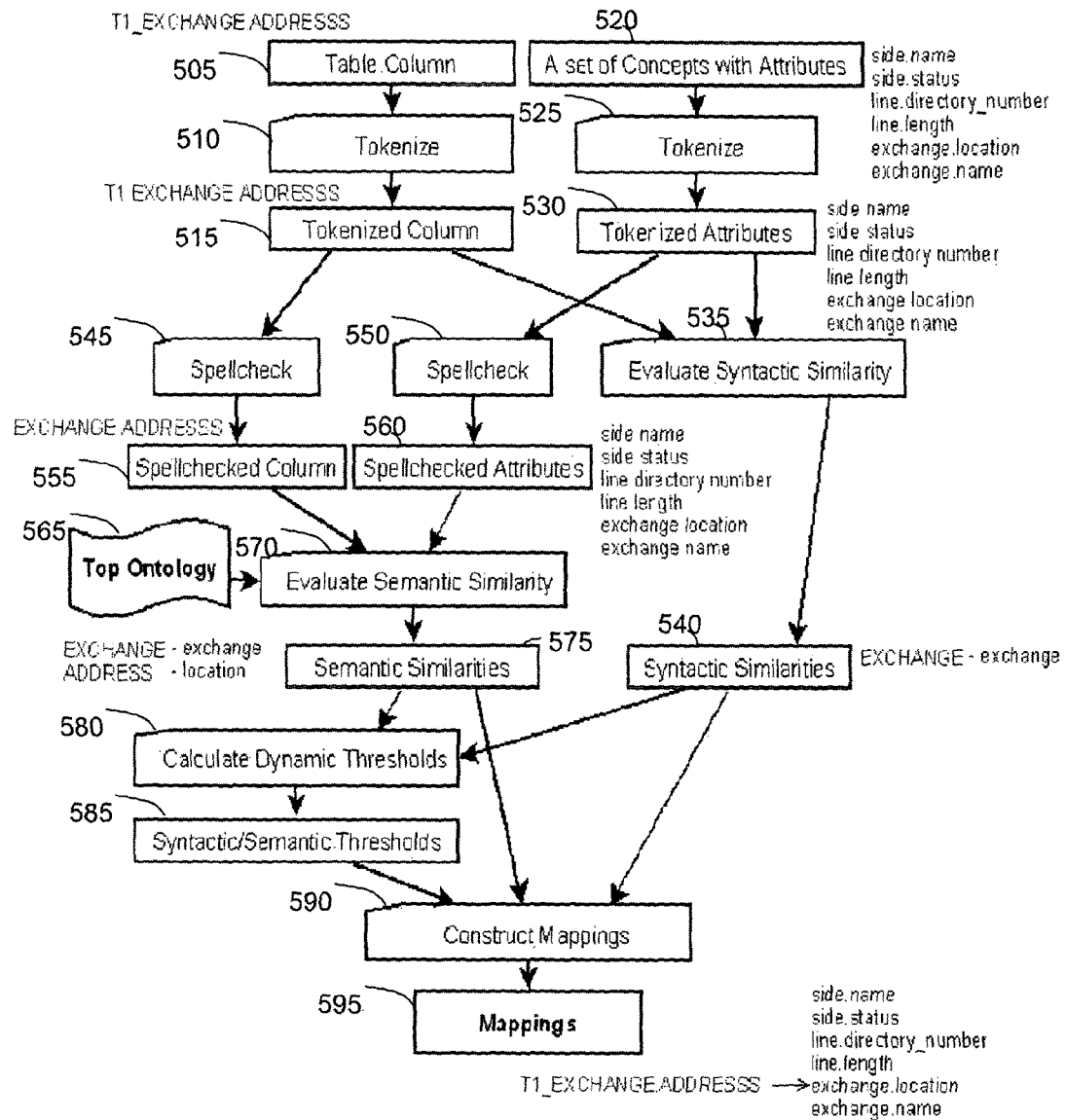
FIG. 5 is a schematic flow chart giving an overview of the steps performed to generate a mapping from a single column/field of the database schema portion to one of the attributes of the ontology portion using the data illustrated in FIGS. 3 and 4.

In order to see how the system 100 of the present embodiment assists a user in generating these mappings, reference is now made to the flow chart of FIG. 5. In overview, The user chooses a database column which is to be mapped into some of the ontology attributes. The table name and the column name are parsed and tokenized according to the non-alphanumeric symbols (e.g. from T1_EXCHANGE.ADDRESS to T1 EXCHANGE ADDRESS) or the case differences (e.g. from ProductName to Product Name). Now, these tokenized values are spell-checked as the semantic similarity checking requires dictionary words. Syntactic and semantic distances between the database column and each ontology attribute are calculated. Here a top ontology is used to calculate the semantic distances. Given the list of the syntactic and semantic distances, thresholds are dynamically calculated. These thresholds determine whether or not a pair should be considered as a valid mapping at all. For each ontology concept, its attribute that has the biggest evaluation value (provided it is over the thresholds) is chosen as the correct mapping.

The following sections illustrate the mapping procedure in detail.

1. Tokenization

Once the user selects at step S505 the database column (in this case the column T1_EXCHANGE.ADDRESS—i.e. the column with name ADDRESS from the table T1_EXCHANGE) to be linked to its corresponding ontology attributes, the table name, the column name, and all the concept names and their attribute names (from the ontology) are parsed and tokenized. The tokenizing of the table and column names is done in step 510 to generate tokenized column and table names at 515. Once a user has indicated to the system what common ontology is to be used, the Ontology concept and attribute names are automatically selected by the system 100 at step 520. The method then iterates through all of the ontology attributes selecting each one in turn and tokenizing the corresponding concept and attribute names at step 525 to generate a set of tokenized concept and attribute names 530. The words in the names of database representational elements (e.g. tables and columns/fields) and in the names of ontology representational elements (e.g. concepts and attributes) are typically connected by non-alphanumeric symbols or by case changes. This is necessary because the empty string is not allowed in either databases or in ontologies according to typical naming conventions of both databases and ontologies. Moreover, sometimes several words can be put together without any separator (e.g. productname). In the case of non-alphanumeric symbols (e.g. product_name), these symbols are used as tokens (e.g. product name). For the case change (e.g. ProductName), when the case changes, the word is tokenized (e.g. Product Name). Finally, for the case of combined words without any specific separators (e.g. productname), the system scans the string and extracts the words that compose the string (e.g. product name). Note that every combination of these three cases (e.g. spain_retailcustomerName) is handled in the tokenization phase.

2. Syntactic Similarity Evaluation

Syntactic similarity evaluation concerns only the form of the strings, not their meanings. Given two (tokenized) words (one taken from the set of tokenized database table and column names 515 and one taken from the set of tokenized ontology concept and attribute names 530), the system checks if they are identical or if one is a substring of the other. If the input words are not equal and neither is a substring of the other, a phonetic algorithm (e.g. the well known and publicly available Java library SoundEx) and a string similarity metrics algorithm (e.g. the well known and publicly available Java library Jaro which is based on the Levenstein edit distance metric) are used to evaluate the similarity. Before applying those algorithms, the system checks first if the ontology word (typically a full word e.g. CustomerName) contains all the vowels in the database word (usually an abbreviated word e.g. CNAME) that is compared with. If there is any extra vowel in the database word (e.g. the vowel U in the column CUST_ID isn't present in the attribute Constant_ID), this pair is considered to be not related and doesn't contribute to the evaluation result. This syntactic similarity evaluation is done between the tokenized database table name and column name against each tokenized ontology concept name and attribute name. These steps are performed at 535 and the output measure of syntactic similarity for each word pair combination is stored as part of the set of syntactic similarity scores 540. Note that a single syntactic similarity score is generated for each attribute and the similarity scores are stored in set 540 for each attribute before the process moves on. For each attribute there may be many word pairs to be compared since the tokenized table and column names may contain more than one word as may the tokenized concept and attribute names—a syntactic similarity component is calculated for each distinct pair of one word from the database set 515 and one from the ontology set of tokenized words, thus if there are two words in each set the total number of distinct pairs is 4, etc.

The particular algorithm employed in the present embodiment to achieve the above is set out below in the form of pseudo code. In the following pseudo code, the following symbols are used: T=the set of tokenized words derived from the name of the database Table, F=the set of tokenized words derived from the name of the particular database Field (i.e. a column) which is being processed in the current iteration, C=the set of tokenized words derived from the name of an ontology Concept, A=the set of tokenized words derived from the name of an ontology Attribute (a Concept, C, has several attributes, A's, in general. Each concept is identified by a single index, x, and each attribute has a pair of indices x and y e.g. C1 has A11, A12, A13, . . . , C2 has attributes A21, A22, A23 . . . , etc.)

```
Syntactic_Eval(xy){ // function to calculate syntactic similarity
    For every pair W1 (in T+F) and w2 (in C+Axy) {
      n= count(T+F); //i.e. the number of words in the set (T + F)
      m= count(C+Axy); //i.e. the number of words in the set (C + Axy)
      Syntactic_Eval(xy) = 0;
      If w1=w2
        Syntactic_Eval(xy) += 7;
      Else
        {
        If partOf(w1, w2) or partOf(w2, w1)
          Eval += 2;
        JaroEval = checkEditDistance(w1, w2);
        SoundExEval = checkSoundSimilarity(w1, w2);
```

-continued

```
        If(JaroEval > 0.8 && SoundExEval > 0.7)
            Syntactic_Eval(xy) += (JaroEval + SoundExEval);
        }
        Next pair;
    }
    Syntactic_Eval = Syntactic_Eval *n/m;
    Return Syntactic_Eval;
}
```

3. Spellchecking

Once the names are tokenized and syntactic similarities for them all have been calculated as described above, the tokenized words are spell-checked and where there is a reasonably confident prediction for the correct spelling of a word which does not appear in the dictionary (which should correspond to the vocabulary terms used in the linked top ontology and discussed below) then the spelling is "corrected"—where there is no reasonable confidence of how to correct the spelling the word is simply discarded because in the present embodiment, valid dictionary words are required for semantic distance evaluation. In this phase, plural nouns and past tense verbs, etc. are converted into their base forms (i.e. to their root stems as they would appear in a dictionary). If no corresponding dictionary word for a tokenized string is found, it is discarded at this stage (as mentioned) and doesn't therefore contribute to the semantic distance evaluation. This happens when the string is severely abbreviated (C for customer in CNAME) or it is just an arbitrary string (e.g. T1 in T1_EXCHANGE). This spell checking and word stemming is performed at step 545 in respect of the database table and column tokenized names to generate a set of spell-checked and stemmed table and column name dictionary words 555. Similarly, the tokenized ontology concept and attribute names are spell checked and stemmed at step 550 to generate a set of spell-checked and stemmed concept and attribute name dictionary words 560.

4. Semantic Similarity Evaluation

The names for the database tables and columns tend to be more concrete and specific whereas the names for the ontology concepts and attributes are more likely to be abstract and general. Therefore, a simple comparison of syntactic word forms isn't sufficient in many cases for an accurate automatic mapping between a database and an ontology. A semantic distance algorithm is therefore employed in the present embodiment to provide a measure of the similarity between the meanings of words. For example, the word 'customer' is closer in its meaning to the word 'person' than the word 'radio' because a customer is a kind of a person.

The present embodiment uses a top ontology to measure the semantic distances between one set of words (the set 555 to be precise) and another set of words (the set of words stored in set 560 in respect of a single iteration) where these words can be nouns as well as other parts of speech such as verbs or adjectives. In addition, the semantic distance measure takes some contextual information into account when it calculates the similarities among these words as is explained below.

The process (which is carried out in step 570 of FIG. 5) makes use of a linked top ontology 565. The linked top ontology has three main components—a top ontology, a set of dictionary terms (words) and a set of links between nodes of the top ontology and the dictionary terms. In the present embodiment, the top ontology was formed by the inventor creating an initial seed top ontology formed from a sub-set of the words found in the well known resource WordNet which are close to a root node of that structure. The inventor then created a word information table using the synset-related information of Wordnet such as Antonym, DirectHyponym, DirectHypernym, Pointer, Cause, CoordinateTerm, MemberHolonym, MemberMeronym, PartHolonym, ParticipleOf, PartMeronym, SubstanceHolonym, SubstanceMeronym, Synonym, Holonym, Entailment, Meronym, AlsoSee, Derived, Attribute, and EntailedBy. Given a word, the inventor found its related words using the synset-relation information in WordNet. If a Wordnet word or one of its related words was found in the top ontology, a corresponding link was made between that word (as a dictionary term) and the word in the top ontology found to be related to it and the link stored. If a frequently used word was not found to be related to any words (i.e. nodes) in the top ontology, the inventor manually expanded the top ontology to include a node which would accommodate the word and then a corresponding dictionary term was added to the linked top ontology data structure together with a link to the newly added ontology node. This process was repeated until all the commonly used words in the databases of interest and in the common ontology were mapped to the top ontology.

As an alternative approach to generating such a linked top ontology, a collaborative approach could be adopted. A collaborative construction of the linked top ontology would start with an empty top ontology with no links to any vocabulary terms. A community of volunteers would populate and extend the top ontology and enhance the links to vocabulary items gradually. This would ideally require a version control system (e.g. wiki-like platform or subversion system) to keep track of the changes and roll back the changes, if necessary.

Once the top ontology link information is collected, the system in the present embodiment finds the number of common top ontology concepts between the database table/column and each ontology concept/attribute (e.g. between (EXCHANGE and ADDRESS) and (exchange and location)). Unlike other similarity measuring algorithms, the approach of the present embodiment is transparent in that the senses of each term which are used are easily accessible, and in that it is easy to see how the evaluation result was obtained.

In addition, if there are any common top ontology concepts between the database table name and the ontology attribute, or between the ontology concept and the database column name, these add weights to the final evaluation value as a contextual contribution. By utilizing this contextual information, the accuracy of the mappings is improved. Unlike other semantic similarity measurement algorithms which return the same static values regardless of the context, the present embodiment in this way can be considered as taking an element of context into account. Another advantage of using a top ontology as opposed to a full ontology (e.g. WordNet) is that a top ontology is concentrated and focused which results in more common concepts (top ontology nodes) being identified when comparing two words. A full ontology by definition is a topology of sparse and widespread concepts, which would be slow, inefficient, and inaccurate if it were used as part of a linked full ontology for calculating a semantic similarity when compared to using a linked top ontology.

The algorithm/formula used in the present embodiment for calculating a semantic similarity measure is set out in mathematical notation below. The output of this process Semantic_Eval(xy) for an Attribute y of ontology Concept x is a positive number greater than or equal to zero, where 0 indicates no semantic similarity and otherwise the greater the number the greater the degree of semantic similarity according to the system's determination of this. These output numbers are not normalised in the present embodiment but this does not matter since they are used for comparative purposes only.

The algorithm employed for calculating the Semantic Similarity for a given database Table and Field and for a given ontology Concept x and Attribute y is set out below in pseudo code. In the pseudo code the following notation is used: T=the set of tokenized spell checked words resulting from processing the database Table name and t is the set of top ontology node names linked to the words in T, F=the set of tokenized spell checked words resulting from processing the database Field name and f is the set of top ontology node names linked to the words in F; C=the set of tokenized spell checked words resulting from processing the ontology Concept name and c is the set of top ontology node names linked to the words in C; and A=the set of tokenized spell checked words resulting from processing the ontology Attribute name and a is the set of top ontology node names linked to the words in A. Finally, m=the number of words in the set {c+a}.

```
Semantic_Eval (xy) {
    K = NoOfCommonTermsIn((t+f),(c+a));
    // i.e. if t+f contained a word w which was also contained in c+a K
    //would equal 1, if there were two words w1 and w2 both contained
    //in t+f and c+a K would equal 2 etc.
    K=K+0.3*(NoOfCommonTermsIn(t,a)+NoOfCommonTermsIn(f,c));
    // this is the context contribution
    Semantic_Eval(xy) = K/m;
    Return Semantic_Eval(xy);
}
```

5. Dynamic Thresholds Calculation

In the present embodiment, having calculated a semantic and a syntactic similarity value (a sort of inverse distance) for the particular column with each of the attributes of the target ontology a thresholding step is performed (at step 580 in FIG. 5) to determine a threshold for the syntactic similarity and a threshold for the semantic similarity. In the present embodiment, the particular column (of a particular table) of the database schema forms the claimed subordinate representational element of the second representation and each attribute (of each concept) of the ontology corresponds to the claimed "each subordinate representational element of the first representation. In this embodiment, the database schema is a representation of a data structure while the ontology is a representation of a set of concepts.

In addition to expecting a database column to be mapped to no more than one attribute in any given concept, it is additionally expected that, although a database column may generally be mapped to an attribute of more than one ontology concept, it will not generally be mapped to an attribute of every ontology concept. For example, the column ADDRESS under the table T1_EXCHANGE shouldn't have any mapping with any attribute under the ontology concepts side or line. To prevent this, thresholds need to put on both syntactic and semantic evaluations. Nevertheless, fixed values for the thresholds would be inappropriate because similarity values vary dramatically depending on the involved words. In present embodiment therefore the following algorithm (expressed in pseudo code) is employed in order to determine a threshold for both the syntactic and semantic similarity measures:

```
//X_Eval(xy) is the similarity evaluation (whether syntactic or semantic -
//the two values which X can take - i.e. the same algorithm is employed
//for calculating both a semantic and a syntactic threshold) of the
//particular column compared to the attribute y in concept x
SortedEvalList(x) = Sorted X_Eval(xy)'s for each Cx
//Biggest threshold is at the end of the list.
a = count(C)    // the number of ontology concepts (e.g. C1, C2, C3, ...,Ca)
b = count(SortedEvalList(x))
// the number of ontology attributes given a concept Cx
// note a*b = the total number of attributes in the ontology
//Remove the biggest evaluation value for each as it usually is an outlier
and often obscures the threshold values.
    removeElementAt(SortedEvalList(x), b)
    b = b − 1;
// If there are not enough evaluation values (e.g. less than 5),
// then get the average of the second last and the third last items
if(b < 5)
        X_Threshold    =    Average(getElementAt(SortedEvalList(x),
b−2), getElementAt(SortedEvalList(x), b−1));
//Otherwise,
Else
{
    // for the syntactic evaluation, get the 3/5th item * 0.9
        if(X is Syntactic)
            Syntactic_Threshold = getElementAt(SortedEvalList(x),
            b*3/5)*0.9;
    // As for the semantic evaluation, get the 4/5th item
        else
            Semantic_Threshold = getElementAt(SortedEvalList(x),
            b*4/5);
}
```

Of course, any similar dynamic threshold could be calculated instead. For example, one could simply calculate the mean and standard distribution of the values and set a threshold based on being a predetermined number of standard deviations away from the mean (e.g. the threshold could be set at 0.5 standard deviations below the mean, or 0.5 standard deviations above the mean etc.).

6. Mapping Construction

Once thresholds are obtained, the similarities between the database column and its corresponding ontology attributes are evaluated. In the present embodiment, this is done by combining the semantic and syntactic similarity scores by multiplying them together. This results in a number (which is not normalised) where both components have equal standing—i.e. if attribute "a" had a syntactic similarity which was twice that of attribute "b" then attribute b would need to have a semantic similarity which was more than twice that of attribute "a" in order to have a greater combined similarity. This relative importance of the similarity scores could be modified in a more sophisticated embodiment by raising one or other of the similarity scores to an exponent other than one—e.g. by taking the product of the semantic similarity squared with the syntactic similarity, etc. In an alternative more sophisticated approach, the semantic and syntactic scores could be normalised and then combined in a weighted sum so as to give a greater emphasis to say the semantic similarity than to the syntactic similarity.

Having calculated a combined similarity value for each attribute, for a given ontology concept, the attribute with the maximum similarity value is chosen for the mapping (such that no more than one attribute per concept is mapped to). If no attribute in a given concept has both its syntactic and semantic similarity numbers bigger than the threshold values, then no mapping is created for the ontology concept with the database column (in the present embodiment). Alternative embodiments could ignore the syntactic similarity altogether if the semantic similarity score is sufficiently high and possibly the other way (e.g. ignore the semantic similarity if the syntactic similarity is sufficiently high)—this could cater for cases where either no semantic similarity can be determined (because for example the database schema table and column names are so highly abbreviated that a dictionary word cannot be derived) or where no syntactic similarity can be derived (e.g. because the words in the database schema are all (syntactically different) synonyms of the words used in the ontology; in practice such cases are rare and normally at least some of the words from the database set and the ontology set will have syntactic similarities and at least some will have semantic similarities so the threshold and combination approach in practice is found to work well.

This mapping process of determining which attributes the particular database column is to be mapped to is performed in step 590 of FIG. 5 in order to generate a set of mappings for the column in question. These are accumulated on a column by column basis in a set of partial mappings 595 until the user is satisfied that all of the columns requiring mapping have been correctly mapped. At this stage the system will have produced a complete mapping in the set of mappings 595 and the process is ended.

As mentioned above, the complete mapping can then be sent to the data integration system 1 for storage in and use by the mapping module 20 (see FIG. 1).

Naturally, the user can overwrite any mappings which are made automatically by the machine 100 in the above described manner and can manually make mappings of his/her own choice as well as, or instead of, relying on the system 100. In the present embodiment the user is enabled to generate the mapping one column at a time. However, in alternative embodiments the user could have the option to select a number (or indeed all) of the columns and for the system to automatically iterate this process through all of the selected columns with the user stepping in to make corrections either after the system has processed all selected columns or by interrupting the process to make corrections as the mappings are made, etc.

A First Example of this Mapping Process

Referring again to FIG. 5, considering the process flow for finding a mapping for the column Address of the table T1_EXCHANGE to one of the attributes associated with the ontology shown in part in FIGS. 3 and 4, including, for example, attributes side.name, . . . exchange.location and exchange.name. After tokenization T1_EXCHANGE.ADDRESS becomes "T1" "exchange" and "address" these are processed with each of the attributes which all generate low scores except for the attributes in the concept exchange since the concept name exchange matches exactly with one of the tokenized words from T1_EXCHANGE.ADDRESS. Since none of the attribute names (location, name or number of cables) matches any of these tokenized words (T1 exchange or address) all of the attributes score equally on the syntactic similarity evaluation. For the semantic evaluation however, the attribute location scores higher than either name or number_ of_cables since location and address have more top ontology nodes to which they are linked in common with each other than for any of the other attributes. Both the syntactic and semantic evaluations for the location attribute of the Exchange concept are found to be above the threshold and the combined similarity score Semantic_Eval*Syntactic_Eval is greater for exchange.location than for any of the other attributes in the exchange concept (because of the higher semantic_Eval score) and so this attribute is selected for being mapped to the column/ field T1_EXCHANGE.ADDRESS.

A Second Example of this Mapping Process

Figure 6:
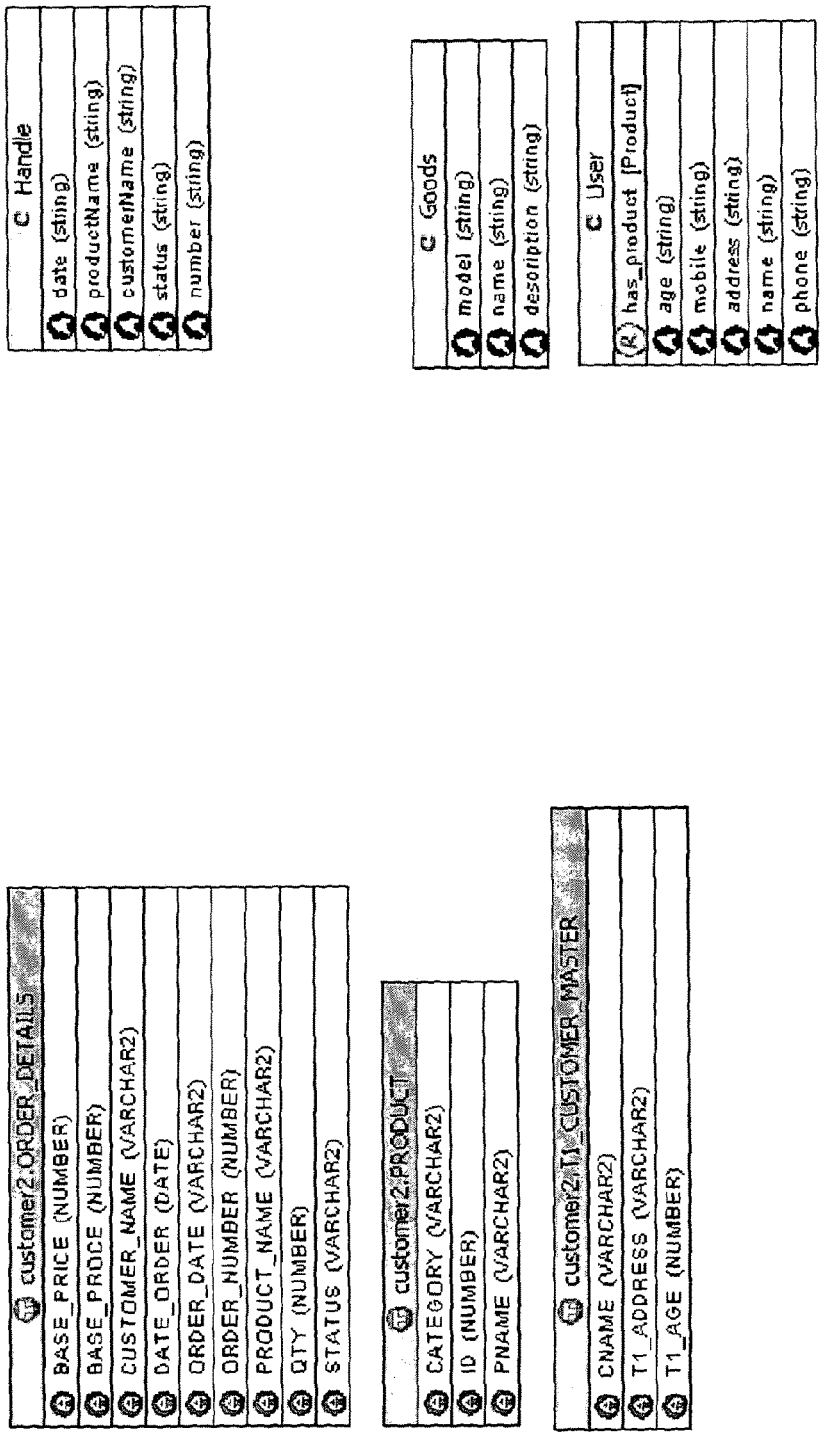
FIG. 6 is a schematic block diagram of a portion of a database schema and a portion of an ontology similar to FIG. 3 but showing portions from a different database and ontology.
Figure 7:
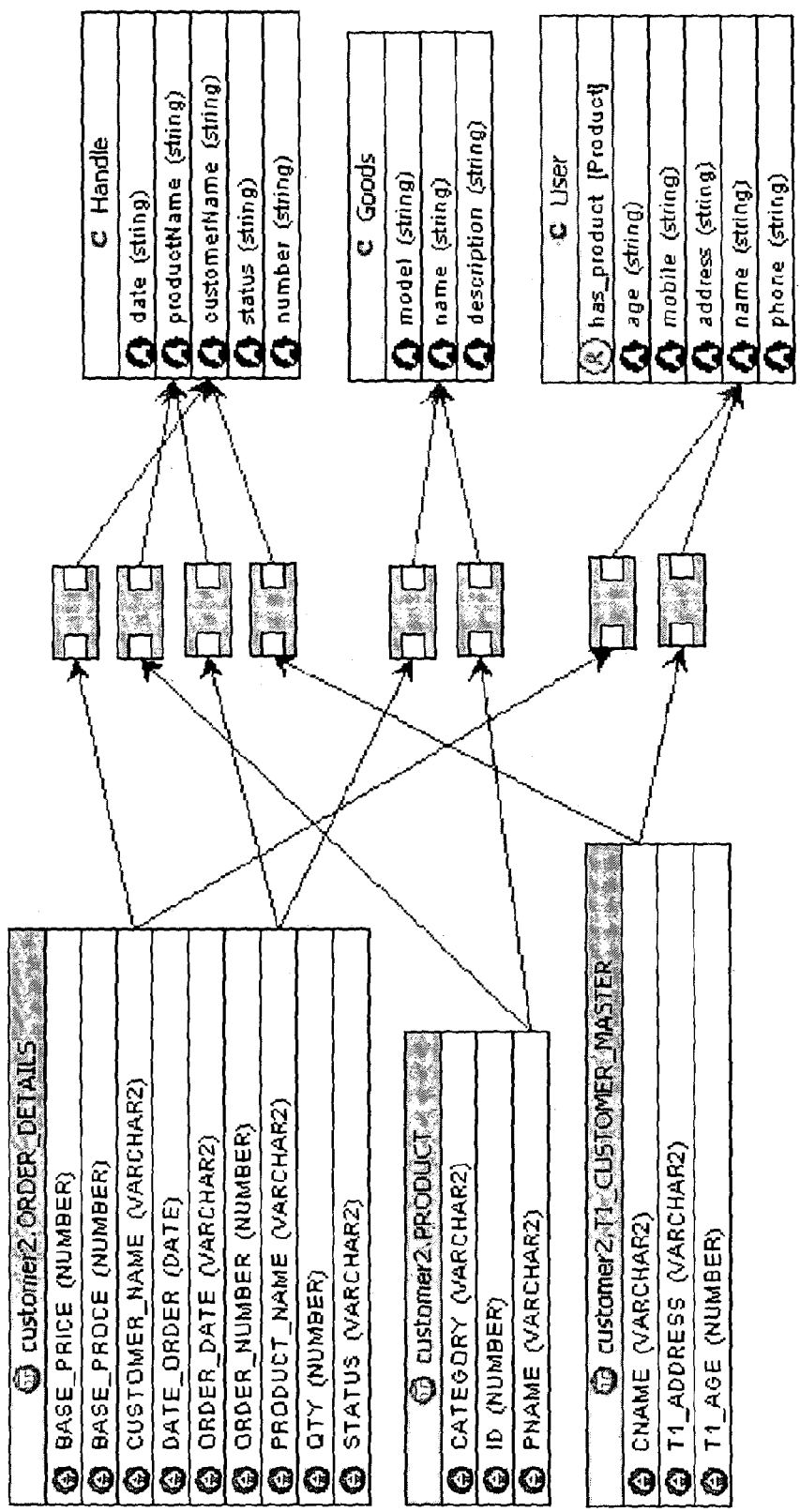
FIG. 7 is similar to FIG. 6 but shows the mappings formed.
Figure 8:
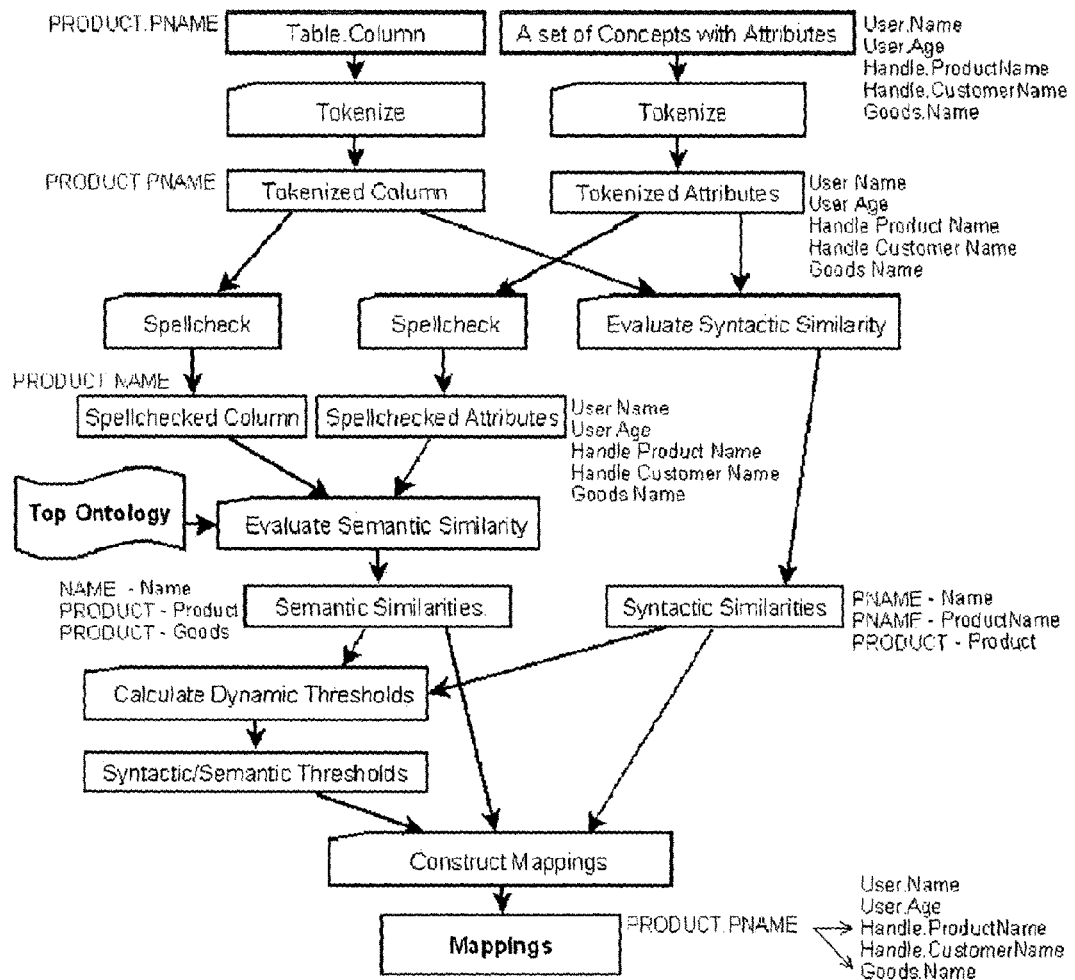
FIG. 8 is similar to FIG. 5 but relates to the data shown in FIGS. 6 and 7 instead of that in FIGS. 3 and 4.

Referring now to FIGS. 6, 7 and 8 a second example of this mapping process is now discussed. In this example we consider mapping the database column PNAME from table PRODUCT to an ontology a part of which is shown in FIGS. 6 and 7 and which includes the following attributes: User.Name, User.Age, Handle.ProductName, Handle.CustomerName, and Goods.Name.

After tokenizing PRODUCT.PNAME we get product and pname and after tokenizing the attributes (in fact the combination of concept name and attribute name) we get e.g. user name, user age, handle product name, handle customer name, and goods name. When a syntactic evaluation is performed for these attributes, a fairly high evaluation is made for User.Name, Handle.CustomerName and Goods.Name (because name is close to pname in terms of edit distance and name is wholly contained in pname and they are evaluated by SoundEx as sounding similar) and a very high evaluation is made for Handle.ProductName because product matches product exactly and name gives a sizable component for the reasons given above. The other attributes get a low syntactic evaluation.

Before doing a semantic evaluation the spell checker corrects pname to name and then a semantic evaluation is performed. As before User.Name and Handle.CustomerName score quite well (because of name matching name) and Handle.ProductName scores very highly (because of the commonality of name and product), but in this case, Goods.Name scores more highly than User.Name and Handle.CustomerName because goods has many more common linked top ontology nodes with those of product than any of user, handle or customer.

After thresholding, User.Name is not selected for mapping because its semantic evaluation falls below the threshold, Handle.ProductName is chosen ahead of Handle.CustomerName for mapping to in the concept Handle and Goods.Name is also selected because its similarity score is the highest in the Goods attribute and its syntactic and semantic evaluations are above the threshold.

The invention claimed is:

1. A data integration method of integrating data from a first and a second heterogeneous data source, each heterogeneous data source taking the form of an electronic database, the method comprising implementing a first wrapper around the first heterogeneous data source, the first wrapper being configured to convert requests and responses between a common format and one specific to the first data source and implementing a second wrapper around the second heterogeneous data source, the second wrapper being configured to convert requests and responses between the common format and one specific to the second data source; wherein each wrapper includes a mapping in the form of a computer readable data file automatically generated according to a method of generating a computer readable data file, on a computer system comprising a digital processor and a memory, the computer readable data file being representative of a mapping between a first representation of a set of concepts or of a data structure associated with the common format and a second representation of a set of concepts or of a data structure associated with a respective one of the first and second data sources, each representation comprising a plurality of complex representational elements which include a number of associated subordinate representational elements, the method of generating a computer readable data file comprising:

the computer system calculating a semantic similarity measure between a subordinate element of the first representation and each of the subordinate elements in the second representation; and the computer system generating a mapping between the subordinate element of the first representation and one of the subordinate elements of the second representation selected in dependence upon the calculated semantic similarity measures between the subordinate elements; wherein calculation of a semantic similarity measure by the computer system includes:

the computer system using a linked top ontology data structure stored within the memory of the computer system, the stored data structure comprising a plurality of concept nodes arranged to form a top ontology, the top ontology being a partial subset of a full ontology having at least twice as many nodes as the top ontology, the nodes in the top ontology being selected from the full ontology based on their ancestral closeness to a root node and/or their ancestral remoteness from a leaf node of the full ontology, the linked top ontology further comprising a plurality of pre-processed vocabulary terms each of which is linked to one or more of the nodes in the top ontology, the linked top ontology data structure being used by the computer system as follows:

the names of the subordinate elements between whom a semantic similarity is being calculated being compared by the computer system with the vocabulary terms and for any vocabulary terms which match the names of the subordinate elements, the computer system identifying the top ontology nodes associated with the matched vocabulary terms and comparing the identified top ontology nodes associated with each name of the subordinate elements, and the computer system determining a semantic similarity based on the degree of commonality between the top ontology nodes associated with each of the subordinate elements.

2. The method according to claim 1 wherein the calculation of a semantic similarity further includes the computer system comparing the names of the complex representational elements with vocabulary terms and identifying the top ontology nodes associated with any matched names and determining the degree of commonality between on the one hand the identified top ontology nodes associated with either one of the subordinate elements and its associated complex representational element and, on the other hand, the other subordinate element and its associated complex representational element.

3. The method according to claim 1 further comprising the computer system performing steps of matching names to vocabulary terms, identifying the top ontology nodes associated with any matched vocabulary terms and determining a degree of commonality between the so identified top ontology nodes in respect of the names of the complex representational elements associated with or which include the respective subordinate elements between which the semantic similarity is being calculated and the converse subordinate elements, and using the degree of commonality determined between these complex elements and their converse subordinate elements as a factor in the determination of overall semantic distance.

4. The data integration method according to claim 1 further comprising: receiving a complex query from a human user or from a computer application, the complex query being expressed in the common format, processing the complex query to form a first sub query for sending to the first heterogeneous data source and a second sub-query for sending to the second heterogeneous data source, sending the first sub-query to the first data source via the first wrapper, the first wrapper converting the first sub-query from the common format to the format specific to the first data source, and sending the second sub-query to the second data source via the second wrapper, the second wrapper converting the second sub-query from the common format to the format specific to the second data source, receiving a first reply to the first sub-query from the first data source in the format specific to the first data source via the first wrapper which converts the first reply from the format specific to the first data source into the common format, receiving a second reply to the second sub-query from the second data source in the format specific to the second data source via the second wrapper which converts the second reply from the format specific to the second data source into the common format, combining the first and second responses together to form a complex response expressed in the common format, and returning the complex response to the requesting human user or computer application.

5. A data integration system including a mapping generating computer system and further including first and second heterogeneous data sources, each data source taking the form of an electronic database, and a first wrapper for wrapping around the first data source and a second wrapper for wrapping around the second data source, wherein the first wrapper is configured to convert requests and responses between a common format and one specific to the first data source and the second wrapper is configured to convert requests and responses between the common format and one specific to the second data source; and wherein each wrapper includes a mapping in the form of a computer readable data file automatically generated by the mapping generating system, and wherein the mapping generating computer system is configured to generate a computer readable data file representative of a mapping between a first representation of a set of concepts or of a data structure associated with the common format and a second representation of a set of concepts or of a data structure associated with a respective one of the first and second data sources, each representation comprising a plurality of complex representational elements which include a number of associated subordinate representational elements, the computer system including:

a semantic similarity calculation module which is executable by the computer system for calculating a semantic similarity measure between a subordinate element of the first representation and each of the subordinate elements in the second representation; and a mapping generation module which is executable by the computer system for generating a mapping between the subordinate element of the first representation and one of the subordinate elements of the second representation selected in dependence upon the calculated semantic similarity measures between the subordinate elements; wherein the system further includes a linked top ontology module which is executable by the computer system for storing a linked top ontology data structure which comprises a plurality of concept nodes arranged into a top ontology, the top ontology being a partial subset of a full ontology having at least twice as many nodes as the top ontology, the nodes in the top ontology being selected from the full ontology based on their ancestral closeness to a root node and/or their ancestral remoteness from a leaf node of the full ontology, the linked top ontology data structure further comprising a plurality of pre-processed vocabulary terms each of which is linked to one or more of the nodes in the top ontology; and wherein the semantic similarity calculation module is configured to compare the names of the subordinate elements between whom a semantic similarity is being calculated with the vocabulary terms and, for any vocabulary terms which match the names of the subordinate elements, to identify the top ontology nodes associated with the matched vocabulary terms and to compare the identified top ontology nodes associated with each name of the subordinate elements, and to determine a semantic similarity based on the degree of commonality between the top ontology nodes associated with each of the subordinate elements.

6. Non-transitory computer readable storage medium carrying instructions which upon execution by a processor provide a method of integrating data from a first and a second heterogeneous data source, each heterogeneous data source taking the form of an electronic database, the method comprising implementing a first wrapper around the first heterogeneous data source, the first wrapper being configured to convert requests and responses between a common format and one specific to the first data source and implementing a second wrapper around the second heterogeneous data source to convert requests and responses between the common format and one specific to the second data source; wherein each wrapper includes a mapping in the form of a computer readable data file automatically generated according to a method of generating a computer readable data file, on a computer system comprising a digital processor and a memory, the computer readable data file being representative of a mapping between a first representation of a set of concepts or of a data structure associated with the common format and a second representation of a set of concepts or of a data structure associated with a respective one of the first and second data sources, each representation comprising a plurality of complex representational elements which include a number of associated subordinate representational elements, the method of generating a computer readable data file comprising:

the computer system calculating a semantic similarity measure between a subordinate element of the first representation and each of the subordinate elements in the second representation; and the computer system generating a mapping between the subordinate element of the first representation and one of the subordinate elements of the second representation selected in dependence upon the calculated semantic similarity measures between the subordinate elements; wherein calculation of a semantic similarity measure by the computer system includes:

the computer system using a linked top ontology data structure stored within the memory of the computer system, the stored data structure comprising a plurality of concept nodes arranged to form a top ontology, the top ontology being a partial subset of a full ontology having at least twice as many nodes as the top ontology, the nodes in the top ontology being selected from the full ontology based on their ancestral closeness to a root node and/or their ancestral remoteness from a leaf node of the full ontology, the linked top ontology further comprising a plurality of pre-processed vocabulary terms each of which is linked to one or more of the nodes in the top ontology, the linked top ontology data structure being used by the computer system as follows:

the names of the subordinate elements between whom a semantic similarity is being calculated being compared by the computer system with the vocabulary terms and for any vocabulary terms which match the names of the subordinate elements, the computer system identifying the top ontology nodes associated with the matched vocabulary terms and comparing the identified top ontology nodes associated with each name of the subordinate elements, and the computer system determining a semantic similarity based on the degree of commonality between the top ontology nodes associated with each of the subordinate elements.

* * * * *